March 24, 1953   H. BLANCHET   2,632,691
PROCESSES FOR THE COOLING OF MOLTEN SULFUR
Filed Aug. 14, 1950
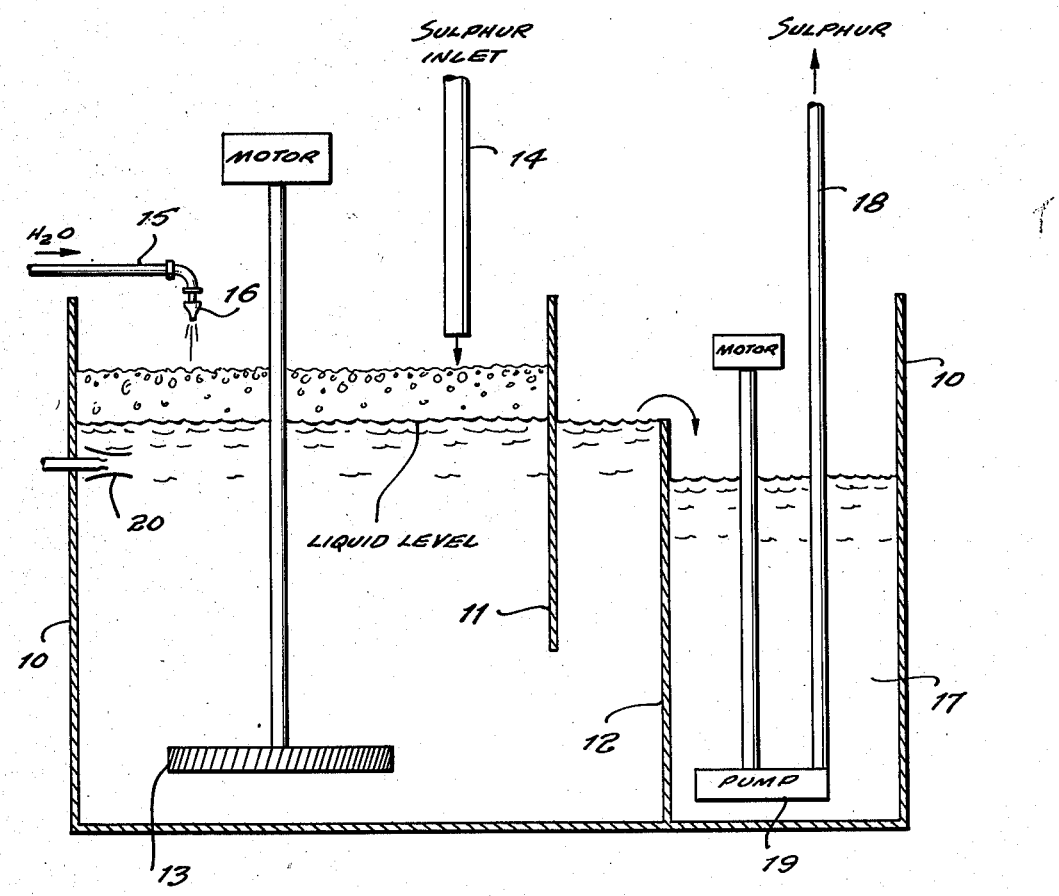
INVENTOR.
HENRY BLANCHET
BY
Pollard & Johnston
ATTORNEYS Patented Mar. 24, 1953

2,632,691

UNITED STATES PATENT OFFICE 2,632,691

PROCESSES FOR THE COOLING OF MOLTEN SULFUR

Henry Blanchet, Ridgefield, N. J., assignor to Freeport Sulphur Company, New York, N. Y., a corporation of Delaware Application August 14, 1950, Serial No. 179,295

6 Claims. (Cl. 23—224)

This invention relates to processes for the cooling of molten sulfur and involves broadly a cooling by means of a volatilizable liquid in direct contact with the molten sulfur which accomplishes cooling primarily by its vaporization.

It has been suggested that liquid sulfur be employed as a medium for the condensation and collection of sulfur from hot gases as in the recovery of labile sulfur given up in the thermal dissociation of pyrite, and for the cooling of sulfur used to scrub the sulfur from reactant gas mixtures containing the same, as a gas mixture containing sulfur derived from dilute hydrogen sulfide gases. The liquid sulfur product increases in temperature and must be cooled for reuse in the process. The peculiar nature of liquid sulfur itself and the presence of dust particles and impurities therein presents a cooling problem for which no very satisfactory answer has been reported. The large volume of sulfur used and the large amount of heat to be dissipated greatly limit further the nature of the cooling procedures which are practically possible.

Of the commonest cooling mediums, air or water surrounding tubes in conventional heat exchange equipment have several disadvantages. Both air and water (surface water) vary in temperature from day to day or from day to night and the danger of excessive cooling leading to solidification of the sulfur in the tubes requires that constant attention and control be exercised. As to water, excessive and frequently unobtainable amounts are required if the water is to be used only once. If the water is to be reused, the cooling of the same by aeration and evaporation in towers leads to concentration of minerals in the water and these deposit and form coatings in the heat exchange equipment requiring periodic shutdowns and cleaning of the towers and the exchanger tubes.

Aeration of the molten sulfur product cannot be employed because of the danger of fire and loss of sulfur in vapor form. The use of water introduced directly into contact with the molten product has been suggested but has not proven satisfactory for the sulfur, although at a temperature above the boiling point of water, entraps a substantial part of the water and will not give it up until a prohibitive time has passed.

An investigation of the cause of this entrapment has now led to the ascertainment of the fact that the water after being broken up into drops formed by stirring the mass to distribute the water through the sulfur mass brings about the formation of solidified sulfur shells surrounding the droplets of water, this effect being due to the transfer of heat to the water from the sulfur causing it to solidify, and since solid sulfur is a good insulator, additional heat from the sulfur surrounding the shells cannot readily penetrate the shells. As a result the water remains encased in the shells for a considerable period of time.

Objects of the invention are to provide processes for the cooling of molten sulfur at a higher temperature to molten sulfur at a lower temperature which (1) are low in operating cost, (2) require only simple apparatus, and (3) are little affected by atmospheric temperature changes and which heretofore involved solidification dangers.

Broadly considered, the invention involves the introduction into molten sulfur to be cooled a quantity of water calculated to take up on evaporation the heat necessary to reduce the temperature of the sulfur to the desired lower level, and agitating the resulting mixture to distribute the water throughout the hot sulfur and to produce droplets of a size such that the heat transferable thereto from the molten sulfur added to that of the water causes complete evaporation of the water rather than its encasement by solidified sulfur shells formable by the cooling effect of entrapped droplets of water, whereby said water evaporates and provides cooled sulfur in a condition substantially free of water.

In accordance with a preferred embodiment of the invention, water in the stated amount is introduced into a mass of hot molten sulfur and the water is distributed throughout the sulfur mass and broken up into fine droplet size by a severe agitation accomplished by any thorough agitating device such as a turbine type agitator. This strenuous agitation not only reduces the size of the droplets of water but apparently also prevents formation, in any substantial quantity, of encapsulated droplets of water by solidified sulfur and breaks up any sulfur coated particles which form. The water ultimately becomes divided in such small droplets that the heat transferred thereto from the circulating sulfur is adequate to cause complete evaporation without leaving any encased in the sulfur shells.

In the foregoing embodiment, the water may be introduced at any temperature most convenient for the particular set of conditions prevailing at the plant and may be at its natural temperature as obtained from the ground or other source or may be preheated to any temperature below its boiling point.

In accordance with a second embodiment of the instant invention the water is introduced in superheated form below the surface of the molten sulfur, suitably in a Venturi type injector, in a pipe or tank. The temperature of the water is above its boiling point at the hydrostatic head imparted by the sub-surface introduction.

In this second embodiment, the agitation which need not be as strenuous as that employed in the first embodiment breaks up the water into droplets and distributes them throughout the sulfur mass. A reduction in the size of the drops and the breaking up of any sulfur shells which form is apparently effected or assisted by the vaporization of the water which commences immediately after its introduction into the sulfur mass. The vaporization occurs not only because of the heat of the superheated water, but also because of the heat absorbed from the molten sulfur. As in the first embodiment, the drops of water are ultimately reduced by the agitation applied to the mass and by its evaporation due to the heat to a size which permits complete evaporation of the water rather than its entrapment by solidified sulfur shells.

The cooling of molten sulfur by the process of the invention following either of the embodiments described above can be very efficiently accomplished in a tank of the construction illustrated in the accompanying drawing. The process is continuously operated by introducing the sulfur and water at or near the top of the tank and at or not substantially below the surface of the molten sulfur to be maintained in the tank. The cooled sulfur is drawn from the bottom or substantially at the bottom of the tank. By this arrangement the water throughout the mass tends to move upwardly toward the upper part of the body of the sulfur rather than toward the outlet and no water, or practically no water, is carried along with the sulfur leaving the tank.

With reference to the drawing, an apparatus for carrying out the process of the first embodiment is diagrammatically illustrated. There is shown a mixing tank 10 preferably of cylindrical shape and constructed of any appropriate material, such as aluminum, steel, concrete and the like. Within the tank to one side thereof there is mounted an underflow baffle plate 11 providing an opening for flow of sulfur therebeneath substantially at the bottom of the tank. An overflow baffle plate 12 is provided between the baffle 11 and the nearer side of the tank and extends to the bottom of the tank. Within the tank there is mounted a turbine type agitator 13.

In operation, molten sulfur is introduced into the top of the tank through an inlet 14 and water is introduced through a conduit 15 and spray nozzle 16 into the top of the tank. Within the tank 10 the sulfur is cooled through the evaporation of the water as hereinbefore described and it flows under the baffle 11 and over the baffle 12 to the discharge compartment 17. From the compartment the sulfur is removed through pipe 18 by the action of the pump 19 and then conveyed to any point of utilization.

The tank is optionally also (or alternatively) provided with a Venturi type injector 20 for accomplishing the agitation and water introduction.

A cooling of sulfur within limits in accordance with the present invention may alternatively be accomplished with an acceptable degree of success by spraying the hot molten sulfur and the water in particles of fine size into a cooling tower. The agitation of the respective particles of sulfur and water in the tower causes the droplets of water to take up the heat from the sulfur both directly by adsorption from the particles and indirectly by adsorption from the gas or vapor in the tower heated by the molten sulfur. As a result, the droplets of water are reduced in size and eventually vaporize completely and hence do not settle out in the molten sulfur leaving the tower. Any particles of solid sulfur formed from the droplets of liquid sulfur will collect in the liquid or molten sulfur and soon be melted by the heat contained therein.

The process of the invention is suitable for the cooling of molten sulfur from any higher temperature to any lower temperature at which the sulfur remains in molten condition. It is quite effectively employed in cooling molten sulfur from a temperature of 300° F. down to 250° F. (a spread of fifty degrees) but may be used to cool the sulfur as little as ten degrees or as much as several hundred degrees. The temperature may be reduced to below 250°, but unless special precautions are taken, there is a danger of solidification since sulfur solidifies at 238° F.

As compared with conventional cooling by indirect heat exchange with water, the process of the instant invention possesses several outstanding advantages. The present process is little affected by atmospheric conditions, requires the use of substantially less water and can utilize water of relatively high mineral content without detrimental effect. As to this last advantage, the mineral matter taken up in the sulfur does not exceed the maximum ash permissible in commercial grade sulfur products.

Another advantage of the instant process lies in its ability to handle molten sulfur containing suspended particles. Whether the particles be catalytic material added for some specific purpose or merely dust particles present as impurities, the cooling operation is not hindered thereby, and deposition of the particles in the cooling apparatus does not occur.

Still another advantage of the present process in contrast with the conventional methods wherein heat exchangers are used, is its apparent inertia toward sudden changes in the temperature of the cooled sulfur product when there is a change in the rate at which the cooling water is added to the hot sulfur. Therefore, the process is not so sensitive as to make the danger of solidification a material consideration in operating the process. In actual operational tests of the instant process in a cooler of commercial proportions, a doubling increase in the predetermined proper rate had little immediate effect upon the final temperature of the cooled sulfur and after a period of approximately fifteen minutes only an insignificant drop in temperature had occurred. Therefore, the process of the invention does not require constant attention or objectionably quick action to avoid solidification. This is in contrast to prior practice wherein a relatively small change in water rate or temperature of cooling water in the conventional type indirect cooler produces immediate corresponding changes in the temperature of the molten sulfur leaving the cooler. The cause of this inertia in the process of the present invention has not been definitely determined, but it is believed that the cooling rate depends in part at least on the area between the sulfur and the water which is not greatly altered by an increase in the water supply.

Example 1

Molten sulfur at a temperature of 300° F. flowing from a scrubbing tower in a sulfur recovery plant, at a rate of fifty tons per hour, was introduced into the top of an agitating tank essentially of the structure of that illustrated in the attached drawing, the tank being eight feet in diameter by seven feet high. Water at a temperature of 60° F. was sprayed upon the surface of the molten sulfur at a rate of 180 gallons per hour, which sulfur filled the tank to a height of approximately three feet. The sulfur was agitated to break up the droplets of water and distribute the same throughout the mass of sulfur by a turbine type agitator twenty inches in diameter rotated at a rate of 125 R. P. M. Cooled molten sulfur was removed from the tank at the rate of introduction such that the level of the sulfur in the tank remained constant. The temperature of the cooled sulfur leaving the tank was 250° F.

Example 2

The operation defined in Example 1 was repeated except that the water introduced was preheated to a temperature of 210° F. before being introduced into the tank. Again the cooling was effectively accomplished and the sulfur pumped from the tank was at a temperature of 250° F.

In the foregoing examples, the utilized agitation intensity was sufficient when 600,000 B. t. u. per hour were dissipated per horsepower. Greater intensities could be used but are not necessary.

It should be understood that the present invention is not limited to the specific details herein given but that it extends to all equivalent procedures and conditions of treatment which will occur to those skilled in the art upon consideration of the scope of the claims appended hereto.

I claim:

1. A process for the cooling of molten sulfur at a higher temperature to molten sulfur at a lower temperature which comprises introducing water into the hot molten sulfur in a quantity calculated to take up on evaporation the heat necessary to reduce the temperature of the sulfur from the higher temperature to the lower temperature, agitating the resulting mixture to distribute the water throughout the sulfur, and breaking up the formed droplets of water ultimately to a size at which the heat transferable thereto added to that of the water causes complete evaporation of the water rather than its encasement by solidified sulfur shells formable by the cooling effect of the entrapped water.

2. A process for the cooling of molten sulfur at a higher temperature to molten sulfur at a lower temperature which comprises, introducing water into the hot molten sulfur in a quantity calculated to take up on evaporation the heat necessary to reduce the temperature of the sulfur from the higher temperature to the lower temperature and agitating the resulting mixture at an intensity which breaks up the droplets of water initially formed to a size at which the heat transferable thereto from the molten sulfur added to that of the water causes complete evaporation of the water rather than its encasement by solidified sulfur shells formable by the cooling effect of entrapped droplets of water, whereby said water evaporates and provides cooled sulfur in a condition substantially free of water.

3. A process for the cooling of molten sulfur at a higher temperature to molten sulfur at a lower temperature which comprises introducing superheated water into the molten sulfur below the surface thereof at a temperature above its boiling point in the molten sulfur at the level the water is introduced and in a quantity calculated to take up on evaporation the heat necessary to reduce the temperature of the sulfur from the higher temperature to the lower temperature, and agitating the resulting mixture whereby the steam formed in and released from droplets of the water and the agitation reduce the size of the droplets, prevent the formation of and disrupt solidified sulfur shells tending to form around droplets of water, and whereby complete evaporation of the water is accomplished.

4. A continuous process for the cooling of sulfur at a higher temperature to molten sulfur at a lower temperature which comprises, flowing the molten sulfur through a cooling zone, introducing water into the hot molten sulfur in said zone in a quantity calculated to take up on evaporation the heat required to reduce the temperature of the sulfur from the higher to the lower temperature, and agitating the resulting mixture at an intensity which prevents ultimately the encasement of any droplets of water in solidified sulfur shells formed by the cooling effect of the entrapped water.

5. A continuous process for the cooling of sulfur at a higher temperature to molten sulfur at a lower temperature which comprises, continuously introducing the molten sulfur into a mass of the hot molten sulfur substantially at the top surface thereof, introducing water into the hot molten sulfur in said zone in a quantity calculated to take up on evaporation the heat required to reduce the temperature of the sulfur from the higher to the lower temperature, and agitating the resulting mixture at an intensity which prevents ultimately the encasement of any droplets of water in solidified sulfur shells formed by the cooling effect of the entrapped water and when the water has evaporated and the sulfur has been cooled to the lower temperature, continuously flowing the sulfur from the mass substantially at the bottom thereof.

6. A continuous process for the cooling of sulfur at a higher temperature to molten sulfur at a lower temperature which comprises, introducing superheated water into the molten sulfur through a Venturi type injector mounted below the surface thereof at a temperature above its boiling point in the molten sulfur at the level the water is introduced and in a quantity calculated to take upon evaporation the heat necessary to reduce the temperature of the sulfur from the higher temperature to the lower temperature, whereby the steam formed in and released from droplets of the water and the agitation caused by said introduction of the air through said injector reduce the size of the droplets, also prevent the formation of and disrupt solidified sulfur shells tending to form around droplets of water, and whereby complete evaporation of the water is accomplished.

HENRY BLANCHET.

REFERENCES CITED

The following references are of record in the file of this patent:

UNITED STATES PATENTS

| Number | Name | Date |
| --- | --- | --- |
| 1,988,768 | Aldridge | Jan. 22, 1935 |